(12) United States Patent
Kunz et al.

(10) Patent No.: US 11,280,897 B2
(45) Date of Patent: Mar. 22, 2022

(54) RADAR FIELD OF VIEW EXTENSIONS

(71) Applicant: Waymo LLC, Mountain View, CA (US)

(72) Inventors: Clayton Kunz, Mountain View, CA (US); Larry Smith, Mountain View, CA (US); Timothy Campbell, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 398 days.

(21) Appl. No.: 16/371,080

(22) Filed: Mar. 31, 2019

(65) Prior Publication Data

US 2020/0309942 A1 Oct. 1, 2020

(51) Int. Cl.
*G01S 13/86* (2006.01)
*G01S 7/40* (2006.01)
*G01S 13/931* (2020.01)

(52) U.S. Cl.
CPC .............. *G01S 13/865* (2013.01); *G01S 7/40* (2013.01); *G01S 13/931* (2013.01); *G01S 2013/9322* (2020.01)

(58) Field of Classification Search
CPC ...... G01S 13/86; G01S 13/865; G01S 13/867; G01S 13/931; G01S 7/4039
See application file for complete search history.

(56) References Cited

U.S. PATENT DOCUMENTS 9,097,800 B1* 8/2015 Zhu ..................... G01S 7/4802
9,469,307 B2* 10/2016 Solyom ................. B60W 10/18
9,720,412 B1* 8/2017 Zhu ...................... G05D 1/0246
2010/0235129 A1* 9/2010 Sharma ................ G01S 7/4972
  702/97
2012/0310466 A1* 12/2012 Fairfield .............. G05D 1/0246
  701/28
2013/0015999 A1* 1/2013 Alland .................. G01S 13/931
  342/70
2013/0151135 A1* 6/2013 Aubrey ................ G08G 1/0116
  701/118

(Continued)

FOREIGN PATENT DOCUMENTS

KR 10-1714233 B1 3/2017

OTHER PUBLICATIONS

International Search Report for corresponding PCT application No. PCT/US2020/022081, dated Jun. 29, 2020.

*Primary Examiner* — Peter M Bythrow
(74) *Attorney, Agent, or Firm* — McDonnell Boehnen Hulbert & Berghoff LLP

(57) ABSTRACT

Disclosed are systems and methods that may be used for determining areas free of objects around a vehicle. The systems and methods include receiving first sensor data from a first sensor having a first field of view and a first range. The systems and methods also include receiving second sensor data from a second sensor having a second field of view and a second range. The systems and methods also include determining, by a processor, a first-sensor occlusion in the first field of view. The systems and methods further include determining, by the processor, an occlusion free-region of the first field of view based on data from the second sensor. Additionally, the systems and methods include operating, by the processor, the vehicle in an autonomous mode based on determining the occlusion free-region.

18 Claims, 11 Drawing Sheets

(56) References Cited

U.S. PATENT DOCUMENTS

| | | | |
|---|---|---|---|
| 2015/0177303 A1* | 6/2015 | Ebling | G01R 29/10 |
| | | | 342/27 |
| 2017/0115387 A1* | 4/2017 | Luders | G01S 17/87 |
| 2017/0242117 A1* | 8/2017 | Izzat | G01S 17/86 |
| 2017/0269196 A1* | 9/2017 | Millar | G01S 7/4026 |
| 2018/0011196 A1 | 1/2018 | Pennecot et al. | |
| 2018/0126984 A1 | 5/2018 | Liu et al. | |
| 2019/0072646 A1* | 3/2019 | Zelen | G01S 13/66 |
| 2019/0213884 A1* | 7/2019 | Kim | G08G 1/163 |
| 2020/0103523 A1* | 4/2020 | Liu | G01S 13/931 |
| 2020/0130685 A1* | 4/2020 | Nguyen | G05D 1/0088 |

\* cited by examiner

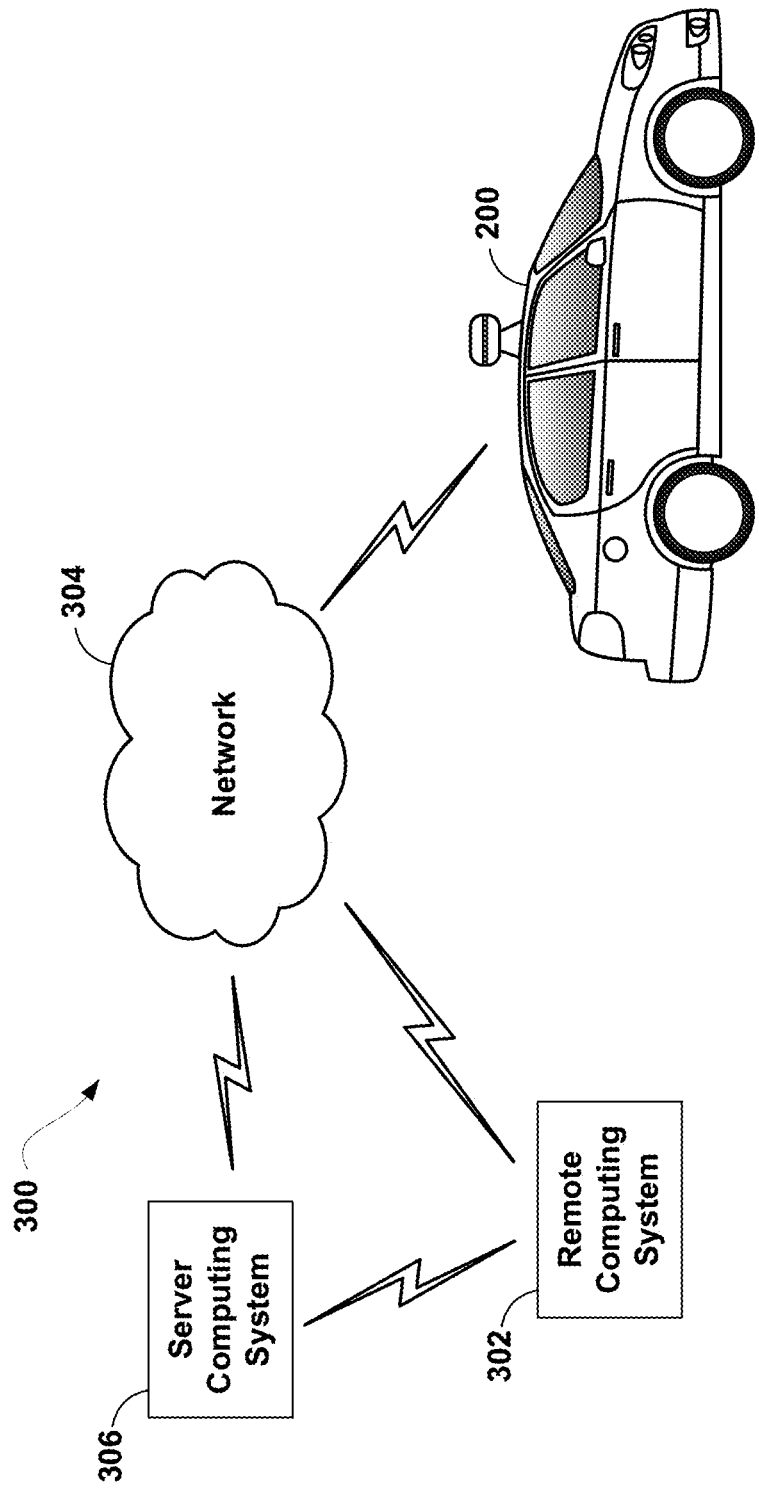

RADAR FIELD OF VIEW EXTENSIONS

BACKGROUND

Vehicles can be configured to operate in an autonomous mode in which the vehicle navigates through an environment with little or no input from a driver. Such autonomous vehicles can include one or more systems (e.g., sensors and associated computing devices) that are configured to detect information about the environment in which the vehicle operates. The vehicle and its associated computer-implemented controller use the detected information to navigate through the environment. For example, if the system(s) detect that the vehicle is approaching an obstacle, as determined by the computer-implemented controller, the controller adjusts the vehicle's directional controls to cause the vehicle to navigate around the obstacle.

For example, an autonomous vehicle may include lasers, sonar, radar, cameras, and other sensors which scan and record data from surroundings of the vehicle. Sensor data from one or more of these devices may be used to detect objects and their respective characteristics (position, shape, heading, speed, etc.). This detection and identification is useful for the safe operation of autonomous vehicles.

SUMMARY

In one example, the present disclosure includes a system. The v includes a first sensor having a first field of view. The system also includes a second sensor having a second field of view. The first field of view may overlap at least a portion of the second field of view. The system also includes a processor configured to determine a first-sensor occlusion in the first field of view. The processor is also configured to determine an occlusion free-region of the first field of view based on data from the second sensor.

Some embodiments of the present disclosure provide a method that includes receiving first sensor data from a first sensor having a first field of view and a first range and receiving second sensor data from a second sensor having a second field of view and a second range. The first field of view may overlap at least a portion of the second field of view and the second range may be greater than the first range. The method also includes determining, by a processor, a first-sensor occlusion in the first field of view. The method further includes determining, by the processor, an occlusion free-region of the first field of view based on data from the second sensor.

Some examples of the present disclosure provides vehicle that includes different types of sensors. The vehicle includes a first LIDAR sensor having a first field of view divided into a first set of sectors and a first range. The vehicle also includes a second LIDAR sensor having a second field of view divided into a second set of sectors and a second range. Additionally, the vehicle includes at least one radar sensor having a radar-sensor field of view divided into a third set of sectors and a third range. In some examples, the radar-sensor field of view overlaps at least a portion of the first or second field of view. Additionally, the vehicle includes a processor configured to determine a first-sensor occlusion in the first field of view or second field of view. The processor may be further configured to determine an occlusion free-region of the first field or second field of view based on data from the radar sensor. Additionally, the processor may be configured to operate the vehicle in an autonomous mode based on determining the occlusion free-region.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 3 is a conceptual illustration of wireless communication between various computing systems related to an autonomous vehicle.

DETAILED DESCRIPTION

Figure 1:
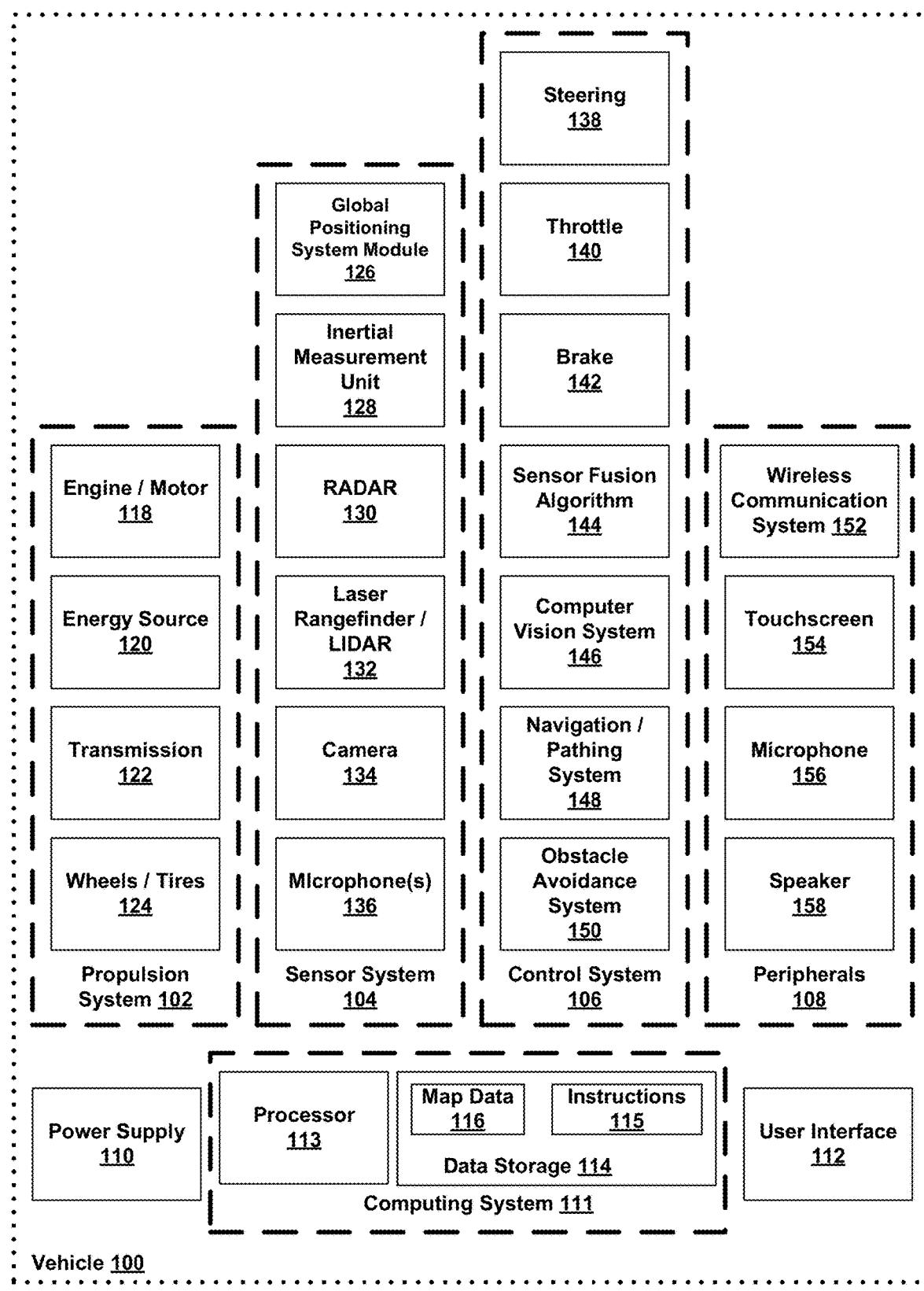
FIG. 1 is a functional block diagram depicting aspects of an example autonomous vehicle.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. OVERVIEW

Many vehicles may include various sensing systems to aid in the navigation and control of the vehicle. Some vehicles may operate in a fully autonomous mode, where no human interaction is used for operations, a semi-autonomous mode, where little human interaction is used for operations, or a human-operated mode, where a human operates the vehicle and sensors may aid the human. The sensors may be used to provide information about the region around the vehicle. This information may be used to identify features of the roadway and other objects (such as other vehicles, pedestrians, etc.) near the vehicle.

The sensor systems of a vehicle may include a light detection and ranging (LIDAR) system and a radar system. LIDAR uses laser pulses to measure the distance to and speed of objects that reflect the laser light. Radar uses radio waves to measure the distance to and speed of objects that reflect the radio waves. The data from the LIDAR and radar systems may be used (possibly along with data from other sensors, such as cameras) to determine where objects are located near the vehicle. Because the LIDAR and radar systems have different ranges and resolutions, one system may be able to provide information is not provided by the other system. The present disclosure is directed toward systems and methods for using sensor data from one sensor to supplement the data from another sensor to provide more accurate information to the vehicle.

In one example, the vehicle may have a processing system that is configured to maneuver the vehicle (or in examples, when the vehicle is driven by a human, determine if the vehicle is performing a safe maneuver). In practice, the processing system may determine a range of free space around the vehicle across the full 360-degree azimuth plane around the vehicle.

To determine the range of free space, the processing system may receive information from a first LIDAR unit that provides 360-degree LIDAR data up to a first range. A second LIDAR unit may provide LIDAR data over a given sector (in some examples, the sector is less than 10 degrees, such as an 8-degree wide section of the 360-degree plane) up to a second range, which is greater than the first range. A plurality of radar units may each provide 90-degrees of radar data of the 360-degree plane with an arrangement of radar units so the radar units combine to provide data over the full 360-degree plane. The radar units may have a third range that is greater than the second range.

In one example of the present disclosure, because the radar units have the longest range, the systems and methods of the present disclosure use the radar units to aid in determining the range to objects that would otherwise not be visible to the LIDAR units. Similarly, in another example, the systems and methods of the present disclosure use the second LIDAR unit with the longer range to aid in determining the range to objects that would otherwise not be visible to the first LIDAR unit. In some further examples, the radar unit may be able to image beyond the range of the LIDAR unit when the LIDAR unit cannot see through an object (such as fog) that the radar unit can see through. Therefore, the processing system may be able to extend the range at which it may determine there are no objects through the use of information from a different sensor.

In some examples, the system may iteratively perform a process as part of the methods disclosed herein. As part of the method, the system may generate a field-of-view grid of the 360-plane around the vehicle. For the grid, the system and method may determine the angle and distance extent of unoccluded regions. Unoccluded regions may be regions around the vehicle that are free from obstacles. Thus, the system may determine areas around the vehicle that are free from obstacles within the field of view of the various sensors. Thus, the field-of-view grid may be generated based on an aggregate of various sensor measurements.

First, the system may limit the absolute field of view by the radar's own estimate of the probability of track, and also to an absolute maximum range. Thus, the maximum range over which unoccluded regions may be determined may be a maximum range at which the radar units may be able to track an object. In some examples, the maximum range may be based on a probability-of-detection threshold. The maximum range may be determined based on the probability of detection of an object at the given range exceeding a threshold.

Next, for each respective angle and/or sector, the system may limit the field of view to the range to the first LIDAR occluder beyond half the range of a LIDAR unit. In instances where an object occludes the field of view of the LIDAR unit, and the object is located further than half the maximum range of the LIDAR unit, the field of view in the section of the grid corresponding to the angular location of the object may be limited to the range to the object causing the occlusion.

Finally, for each respective angle and/or sector, the system may limit the field of view to the range to the first detection that falls in a region that is either occluded or beyond all LIDAR ranges at that given angle. In instances where there was no LIDAR occlusion in the range between one half of the LIDAR maximum range and the LIDAR maximum range, the system may extend the field of view in the section of the grid corresponding to the angular location based on radar sensor data that is from a range beyond the range of the LIDAR range. In some examples, the radar data may extend the field of view in the section of the grid corresponding to the angular location based on radar sectors. The range of the field of view in the section of the grid may be extended to an occlusion (i.e., detected object) that is further than the LIDAR range, but shorter than the radar range. In instances where no occlusions are detected in a sector, the field of view in the section of the grid corresponding to the angular location may be extended to the maximum range of the radar unit. Thus, for every angle the range with no occlusions may be based on (i) a maximum range of the LIDAR unit; (ii) the distance to a radar occlusion beyond a range of the LIDAR unit; and (iii) the distance to a LIDAR occlusion beyond half the maximum range of the LIDAR unit.

As discussed, the field of view for the full system may also be limited to the detected occluder distance at the respective angle to the occluding object. In practice, by limiting the system field of view for the radar unit based on the LIDAR occlusion, the system may reduce the risk of false confidence of extended radar range when the radar is occluded but no detections are found on the occluder. Restricting the search to the second half of the LIDAR range also reduces the chance that the first detection we see beyond the LIDAR range is a reflection, and allows the radars to "see over" close occluders. For example, because the LIDAR and radar units are not necessarily mounted in the exact same location, in some examples, the radar may be able to see past the LIDAR occlusion(s). By only searching the second half of the LIDAR range for occluders, situations where the radar can see around occlusions may enable the system to extend the overall field of view for situations where the radar unit can see past some occlusions.

This system combines the longer range provided by the radar units with the higher azimuth resolution provided by the LIDAR units to give an increased confidence about unoccluded space. More specifically, a system that only uses radar to determine unoccluded space would not have as high resolution because the radar detections would cover too much of the angular area that we have given the lower angular resolution. Similarly, in a system with only LIDAR, it may have a shorter range and may suffer from not being able to see through or past certain occluders. Thus, the present systems and methods enable a more accurate, longer range, and higher resolution occupancy grid to be determined.

II. EXAMPLE SYSTEMS AND DEVICES

Example systems and devices will now be described in greater detail. In general, the embodiments disclosed herein can be used with any system that includes one or more sensors that scan an environment of the system. Illustrative embodiments described herein include vehicles that employ sensors, such as LIDARs, RADARs, SONARs, cameras, etc. However, an example system may also be implemented in or take the form of other devices, such as robotic devices, industrial systems (e.g., assembly lines, etc.), or mobile communication systems or devices, among other possibilities.

The term "vehicle" is broadly construed herein to cover any moving object, including, for instance, an aerial vehicle, watercraft, spacecraft, a car, a truck, a van, a semitrailer truck, a motorcycle, a golf cart, an off-road vehicle, a warehouse transport vehicle, tractor, or a farm vehicle, as well as a carrier that rides on a track such as a roller coaster, trolley, tram, or train car, among other examples. Some vehicles may operate in a fully autonomous mode, where no human interaction is used for operations, a semi-autonomous mode, where no little human interaction is used for operations, or a human-operated mode, where a human operates the vehicle and sensors may aid the human.

In example embodiments, an example vehicle system may include one or more processors, one or more forms of memory, one or more input devices/interfaces, one or more output devices/interfaces, and machine-readable instructions that when executed by the one or more processors cause the system to carry out the various functions, tasks, capabilities, etc., described above. Example systems within the scope of the present disclosure will be described in greater detail below.

FIG. 1 is a functional block diagram illustrating a vehicle 100 according to an example embodiment. The vehicle 100 may be configured to operate fully or partially in an autonomous mode, and thus may be referred to as an "autonomous vehicle." The vehicle may also be configured to be operated by a human, but provide information to the human through the vehicle's sensing systems. For example, a computing system 111 can control the vehicle 100 while in an autonomous mode via control instructions to a control system 106 for the vehicle 100. The computing system 111 can receive information from one or more sensor systems 104, and base one or more control processes (such as setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, a sensor system 104, a control system 106, one or more peripherals 108, a power supply 110, a computing system 111, and a user interface 112. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments, the propulsion system 102 includes an engine/motor 118, an energy source 120, a transmission 122, and wheels/tires 124. The engine/motor 118 converts energy source 120 to mechanical energy. In some embodiments, the propulsion system 102 can optionally include one or both of engines and/or motors. For example, a gas-electric hybrid vehicle can include both a gasoline/diesel engine and an electric motor.

The energy source 120 represents a source of energy, such as electrical and/or chemical energy, that may, in full or in part, power the engine/motor 118. That is, the engine/motor 118 can be configured to convert the energy source 120 to mechanical energy to operate the transmission. In some embodiments, the energy source 120 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 120 can also provide energy for other systems of the vehicle 100.

The transmission 122 includes appropriate gears and/or mechanical elements suitable to convey the mechanical power from the engine/motor 118 to the wheels/tires 124. In some embodiments, the transmission 122 includes a gearbox, a clutch, a differential, a drive shaft, and/or axle(s), etc.

The wheels/tires 124 are arranged to stably support the vehicle 100 while providing frictional traction with a surface, such as a road, upon which the vehicle 100 moves. Accordingly, the wheels/tires 124 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 124 of vehicle 100 may be operable to rotate differentially with respect to other wheels/tires 124. The wheels/tires 124 can optionally include at least one wheel that is rigidly attached to the transmission 122 and at least one tire coupled to a rim of a corresponding wheel that makes contact with a driving surface. The wheels/tires 124 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 126, an inertial measurement unit (IMU) 128, a radar unit 130, a laser rangefinder/LIDAR unit 132, a camera 134, and/or a microphone 136. The sensor system 104 could also include sensors configured to monitor internal systems of the vehicle 100 (e.g., $O_2$ monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 126 is a sensor configured to estimate a geographic location of the vehicle 100. To this end, GPS 126 can include a transceiver operable to provide information regarding the position of the vehicle 100 with respect to the Earth.

The IMU 128 can include any combination of sensors (e.g., accelerometers and gyroscopes) configured to sense position and orientation changes of the vehicle 100 based on inertial acceleration.

The radar unit 130 can represent a system that utilizes radio signals to sense objects within the local environment of the vehicle 100. In some embodiments, in addition to sensing the objects, the radar unit 130 and/or the computing system 111 can additionally be configured to sense the speed and/or heading of the objects. The radar unit 130 may include any antenna(s), waveguide networks, communication chip(s), and/or other components that may facilitate radar operation.

Similarly, the laser rangefinder or LIDAR unit 132 can be any sensor configured to sense objects in the environment in which the vehicle 100 is located using lasers. The laser rangefinder/LIDAR unit 132 can include one or more laser sources, a laser scanner, and one or more detectors, among other system components. The laser rangefinder/LIDAR unit 132 can be configured to operate in a coherent (e.g., using heterodyne detection) or an incoherent detection mode.

The camera 134 can include one or more devices configured to capture a plurality of images of the environment surrounding the vehicle 100. The camera 134 can be a still camera or a video camera. In some embodiments, the camera 134 can be mechanically movable such as by rotating and/or tilting a platform to which the camera is mounted. As such, a control process of vehicle 100 may be implemented to control the movement of camera 134.

The sensor system 104 can also include a microphone 136. The microphone 136 can be configured to capture sound from the environment surrounding vehicle 100. In some cases, multiple microphones can be arranged as a microphone array, or possibly as multiple microphone arrays.

The control system 106 is configured to control operation (s) regulating acceleration of the vehicle 100 and its components. To effect acceleration, the control system 106 includes a steering unit 138, throttle 140, brake unit 142, a sensor fusion algorithm 144, a computer vision system 146, a navigation/pathing system 148, and/or an obstacle avoidance system 150, etc.

The steering unit 138 is operable to adjust the heading of vehicle 100. For example, the steering unit can adjust the axis (or axes) of one or more of the wheels/tires 124 so as to effect turning of the vehicle. The throttle 140 is configured to control, for instance, the operating speed of the engine/motor 118 and, in turn, adjust forward acceleration of the vehicle 100 via the transmission 122 and wheels/tires 124. The brake unit 142 decelerates the vehicle 100. The brake unit 142 can use friction to slow the wheels/tires 124. In some embodiments, the brake unit 142 inductively decelerates the wheels/tires 124 by a regenerative braking process to convert kinetic energy of the wheels/tires 124 to electric current.

The sensor fusion algorithm 144 is an algorithm (or a computer program product storing an algorithm) configured to accept data from the sensor system 104 as an input. The data may include, for example, data representing information sensed at the sensors of the sensor system 104. The sensor fusion algorithm 144 can include, for example, a Kalman filter, Bayesian network, etc. The sensor fusion algorithm 144 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 146 can process and analyze images captured by camera 134 to identify objects and/or features in the environment surrounding vehicle 100. The detected features/objects can include traffic signals, roadway boundaries, other vehicles, pedestrians, and/or obstacles, etc. The computer vision system 146 can optionally employ an object recognition algorithm, a Structure From Motion (SFM) algorithm, video tracking, and/or available computer vision techniques to effect categorization and/or identification of detected features/objects. In some embodiments, the computer vision system 146 can be additionally configured to map the environment, track perceived objects, estimate the speed of objects, etc.

The navigation and pathing system 148 is configured to determine a driving path for the vehicle 100. For example, the navigation and pathing system 148 can determine a series of speeds and directional headings to effect movement of the vehicle along a path that substantially avoids perceived obstacles while generally advancing the vehicle along a roadway-based path leading to an ultimate destination, which can be set according to user inputs via the user interface 112, for example. The navigation and pathing system 148 can additionally be configured to update the driving path dynamically while the vehicle 100 is in operation on the basis of perceived obstacles, traffic patterns, weather/road conditions, etc. In some embodiments, the navigation and pathing system 148 can be configured to incorporate data from the sensor fusion algorithm 144, the GPS 126, and one or more predetermined maps so as to determine the driving path for vehicle 100.

The obstacle avoidance system 150 can represent a control system configured to identify, evaluate, and avoid or otherwise negotiate potential obstacles in the environment surrounding the vehicle 100. For example, the obstacle avoidance system 150 can effect changes in the navigation of the vehicle by operating one or more subsystems in the control system 106 to undertake swerving maneuvers, turning maneuvers, braking maneuvers, etc. In some embodiments, the obstacle avoidance system 150 is configured to automatically determine feasible ("available") obstacle avoidance maneuvers on the basis of surrounding traffic patterns, road conditions, etc. For example, the obstacle avoidance system 150 can be configured such that a swerving maneuver is not undertaken when other sensor systems detect vehicles, construction barriers, other obstacles, etc. in the region adjacent the vehicle that would be swerved into. In some embodiments, the obstacle avoidance system 150 can automatically select the maneuver that is both available and maximizes safety of occupants of the vehicle. For example, the obstacle avoidance system 150 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 152, a touchscreen 154, a microphone 156, and/or a speaker 158.

In some embodiments, the peripherals 108 function to receive inputs for a user of the vehicle 100 to interact with the user interface 112. To this end, the touchscreen 154 can both provide information to a user of vehicle 100, and convey information from the user indicated via the touchscreen 154 to the user interface 112. The touchscreen 154 can be configured to sense both touch positions and touch gestures from a user's finger (or stylus, etc.) via capacitive sensing, resistance sensing, optical sensing, a surface acoustic wave process, etc. The touchscreen 154 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 156 can be configured to receive audio (e.g., a voice command or other audio input) from a user of the vehicle 100. Similarly, the speakers 158 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 152 can wirelessly communicate with one or more devices directly or via a communication network. The wireless communication system 152 can optionally use 3G cellular communication, such as CDMA, EVDO, GSM/GPRS, and/or 4G cellular communication, such as WiMAX or LTE. Additionally or alternatively, wireless communication system 152 can communicate with a wireless local area network (WLAN), for example, using WiFi. In some embodiments, wireless communication system 152 could communicate directly with a device, for example, using an infrared link, Bluetooth, and/or ZigBee. The wireless communication system 152 can include one or more dedicated short-range communication (DSRC) devices that can include public and/or private data communications between vehicles and/or roadside stations. Other wireless protocols for sending and receiving information embedded in signals, such as various vehicular communication systems, can also be employed by the wireless communication system 152 within the context of the present disclosure.

As noted above, the power supply 110 can provide power to components of vehicle 100, such as electronics in the peripherals 108, computing system 111, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 120 can be implemented together, as in some all-electric cars.

Many or all of the functions of vehicle 100 can be controlled via computing system 111 that receives inputs from the sensor system 104, peripherals 108, etc., and communicates appropriate control signals to the propulsion system 102, control system 106, peripherals, etc. to effect automatic operation of the vehicle 100 based on its surroundings. computing system 111 includes at least one processor 113 (which can include at least one microprocessor) that executes instructions 115 stored in a non-transitory computer readable medium, such as the data storage 114. The computing system 111 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information as map data 116. Such information may be used by vehicle 100 and computing system 111 during operation of the vehicle 100 in the autonomous, semi-autonomous, and/or manual modes to select available roadways to an ultimate destination, interpret information from the sensor system 104, etc.

The vehicle 100, and associated computing system 111, provides information to and/or receives input from, a user of vehicle 100, such as an occupant in a passenger cabin of the vehicle 100. The user interface 112 can accordingly include one or more input/output devices within the set of peripherals 108, such as the wireless communication system 152, the touchscreen 154, the microphone 156, and/or the speaker 158 to allow communication between the computing system 111 and a vehicle occupant.

The computing system 111 controls the operation of the vehicle 100 based on inputs received from various subsystems indicating vehicle and/or environmental conditions (e.g., propulsion system 102, sensor system 104, and/or control system 106), as well as inputs from the user interface 112, indicating user preferences. For example, the computing system 111 can utilize input from the control system 106 to control the steering unit 138 to avoid an obstacle detected by the sensor system 104 and the obstacle avoidance system 150. The computing system 111 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 134 can capture a plurality of images that represent information about an environment of the vehicle 100 while operating in an autonomous mode. The environment may include other vehicles, traffic lights, traffic signs, road markers, pedestrians, etc. The computer vision system 146 can categorize and/or recognize various aspects in the environment in concert with the sensor fusion algorithm 144, the computing system 111, etc. based on object recognition models pre-stored in data storage 114, and/or by other techniques.

Although the vehicle 100 is described and shown in FIG. 1 as having various components of vehicle 100, e.g., wireless communication system 152, computing system 111, data storage 114, and user interface 112, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2:
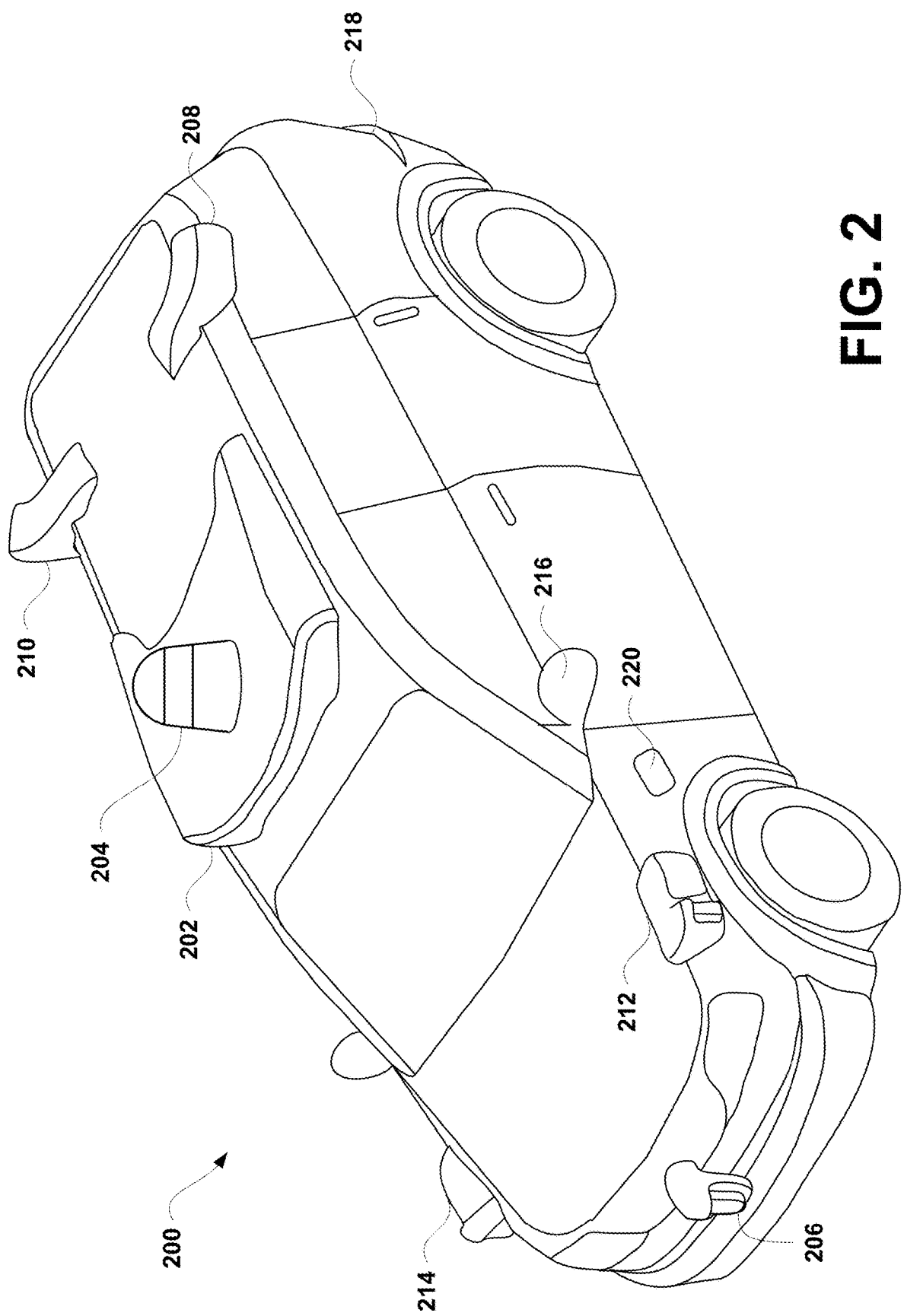
FIG. 2 depicts an exterior view of an example autonomous vehicle.

FIG. 2 shows an example vehicle 200 that can include some or all of the functions described in connection with vehicle 100 in reference to FIG. 1. Although vehicle 200 is illustrated in FIG. 2 as a four-wheel car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a first LIDAR unit 204, a second LIDAR unit 206, a first radar unit 208, a second radar unit 210, a first LIDAR/radar unit 212, a second LIDAR/radar unit 214, a third radar unit 220, and two additional locations 216, 218 at which a radar unit, LIDAR unit, laser rangefinder unit, and/or other type of sensor or sensor(s) could be located on the vehicle 200. Each of the first LIDAR/radar unit 212 and the second LIDAR/radar unit 214 can take the form of a LIDAR unit, a radar unit, or both. Additionally, another radar unit may be included on the opposite side of the vehicle from radar unit 220.

Furthermore, the example vehicle 200 can include any of the components described in connection with vehicle 100 of FIG. 1. The first, second, and third radar units 208, 210, 220 and/or the first and second LIDAR units 204, 206 can actively scan the surrounding environment for the presence of potential obstacles and can be similar to the radar unit 130 and/or laser rangefinder/LIDAR unit 132 in the vehicle 100. Additionally, the first LIDAR/radar unit 212 and second LIDAR/radar unit 214 can actively scan the surrounding environment for the presence of potential obstacles and can be similar to the radar unit 130 and/or laser rangefinder/LIDAR unit 132 in the vehicle 100.

In some examples, the LIDAR units may be one of two different types of LIDAR unit. A first type of LIDAR unit may be a LIDAR that rotates and can continuously scan the full region of the LIDAR unit's field of view. A second type of LIDAR unit may be a LIDAR that can rotate and be steered to scan a specific region of the LIDAR unit's field of view. The first type of LIDAR unit may have a shorter range than the second type of LIDAR unit. The second type of LIDAR unit may have a smaller field of view when operating compared to the first LIDAR unit. In some examples, one or more of the designated LIDAR units of vehicle 200 may contain one or both types of LIDAR unit. For example, LIDAR unit 204 mounted on the top of the vehicle may contain both types of LIDAR units. In one example, the second type of LIDAR unit may have a field of view in operation that is 8-degrees wide in the horizontal plane and 15-degrees wide in the vertical plane.

The sensor unit 202 is mounted atop the vehicle 200 and includes one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, although other mounting locations are possible. Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the region in the back of the car 200 for the presence of radio-reflective objects. Similarly, the first LIDAR/radar unit 212 and the second LIDAR/radar unit 214 may be mounted near the front of the vehicle to actively scan a region in front of the vehicle. A radar scanner can be situated, for example, in a location suitable to illuminate a region including a forward-moving path of the vehicle 200 without occlusion by other features of the vehicle 200. For example, a radar scanner can be situated to be embedded and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

In practice, each radar unit may be able to scan over a 90-degree beamwidth. When radar units are placed at the corners of the vehicle, as shown by radar units 208, 210, 212, and 214, each radar unit may be able to scan a 90-degree field of view in the horizontal plane and provide the vehicle with a radar field of view of the full 360-degree area around the vehicle. Further, the vehicle may also include two side-facing radar units, one shown as radar unit 220 (and the second not shown on the opposite side of the vehicle from radar unit 220). The side-facing radar units may be able to provide further radar imaging when other radar units are obstructed, such as when making a protected right hand turn (i.e., a right-hand turn when there's another vehicle in the lane to the left of the turning vehicle).

Although not shown in FIG. 2, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include dedicated short-range communications (DSRC), radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. In one particular example, the sensor unit 202 may contain both optical cameras (i.e., cameras that capture human-visible light) and infrared cameras. Infrared cameras may be able to capture images of heat within the camera's field of view.

The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

Further, the camera sensor may be configured with a rolling shutter. A rolling shutter generally will iteratively sample the light sensor to capture image data. The data from the camera sensor may form an image, a plurality of images, or a video. For example, in a traditional image sensor, a rolling shutter may iteratively sample the light sensor one row of cells at a time. When sampling a camera sensor that has a rolling shutter, objects in the field of view of the sensor that have a high speed may appear distorted. Such distortions are caused by the iterative sampling. Because lines of cells are sampled iteratively, the object being imaged moves slightly between each sampling. Therefore, each line will be sampled a slightly later time than the previous line. Due to the delay in sampling respective lines an object having horizontal motion may have a horizontal skew. For example, a vehicle moving across the field of view of the sensor may have a horizontal skew and vertical compression (or expansion) that distorts the vehicle. This skew may be troublesome for processing based on the horizontal location of objects in an image. The present system may help identify possible camera distortions caused by a rolling shutter.

FIG. 3 is a conceptual illustration of wireless communication between various computing systems related to an autonomous vehicle, according to an example implementation. In particular, wireless communication may occur between remote computing system 302 and vehicle 200 via network 304. Wireless communication may also occur between server computing system 306 and remote computing system 302, and between server computing system 306 and vehicle 200. During the operation of the vehicle 200, the vehicle may send and receive data from both the server computing system 306 and remote computing system 302 to aid in the operation of the vehicle 200. The vehicle 200 may communicate data related to its operation and data from its sensors to the server computing system 306 and the remote computing system 302. Additionally, the vehicle 200 may receive operational instructions and/or data related to objects sensed by the vehicle's sensors from the server computing system 306 and remote computing system 302.

Vehicle 200 can correspond to various types of vehicles capable of transporting passengers or objects between locations, and may take the form of any one or more of the vehicles discussed above.

Remote computing system 302 may represent any type of device related to remote assistance and operation techniques, including but not limited to those described herein. Within examples, remote computing system 302 may represent any type of device configured to (i) receive information related to vehicle 200, (ii) provide an interface through which a human operator or computer operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some implementations, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some implementations, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some implementations of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, or perhaps server computing system 306, or a computing system local to vehicle 200) may operate to use a camera to capture images of the environment of an autonomous vehicle. In general, at least one computing system will be able to analyze the images and possibly control the autonomous vehicle.

In some implementations, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a radar unit may be configured to transmit an electromagnetic signal that reflects off one or more objects near the vehicle. The radar unit may then capture electromagnetic signals that reflected off the objects. The captured reflected electromagnetic signals may enable the radar system (or processing system) to make various determinations about objects that reflected the electromagnetic signal. For example, the distance and position to various reflecting objects may be determined. In some implementations, the vehicle may have more than one radar in different orientations. In practice, a vehicle may have six different radar units. Additionally, each radar unit may be configured to steer a beam to one of four different sectors of the radar unit. In various examples, the radar unit may be able to scan a beam over a 90-degree range, by scanning each of the four different sectors of the radar unit. The radar system may be configured to store captured information to a memory for later processing by a processing system of the vehicle. The information captured by the radar system may be environment data.

In another example, a laser range finder (e.g., LIDAR unit) may be configured to transmit an electromagnetic signal (e.g., light, such as that from a gas or diode laser, or other possible light source) that may reflect off one or more target objects near the vehicle. The laser range finder may be able to capture the reflected electromagnetic (e.g., laser) signals. The captured reflected electromagnetic signals may enable the range-finding system (or processing system) to determine a range to various objects, such as the objects that reflected the electromagnetic signals back to the laser range finder. The range-finding system may also be able to determine a velocity or speed of target objects and store it as environment data.

In some implementations, the processing system may be able to combine information from the various sensors in order to make further determinations of the environment of the vehicle. For example, the processing system may combine data from both radar information and a captured image to determine if another vehicle or pedestrian is in front of the autonomous vehicle. In other implementations, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle.

The vehicle may detect objects of the environment in various ways depending on the source of the environment data. In some implementations, the environment data may come from a camera and be image or video data. The vehicle may analyze the captured image or video data to identify objects in the image or video data. In other implementations, the environment data may come from a LIDAR unit. The methods and apparatuses may be configured to monitor image and/or video data for the presence of objects of the environment. In other implementations, the environment data may be radar, audio, or other data. The vehicle may be configured to identify objects of the environment based on the radar, audio, or other data.

In some implementations, the techniques the vehicle uses to detect objects may be based on a set of known data. For example, data related to environmental objects may be stored to a memory located in the vehicle. The vehicle may compare received data to the stored data to determine objects. In other implementations, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

III. EXAMPLE SYSTEMS AND METHODS

Example systems and methods of the present disclosure will now be described in more detail.

Figure 4A:
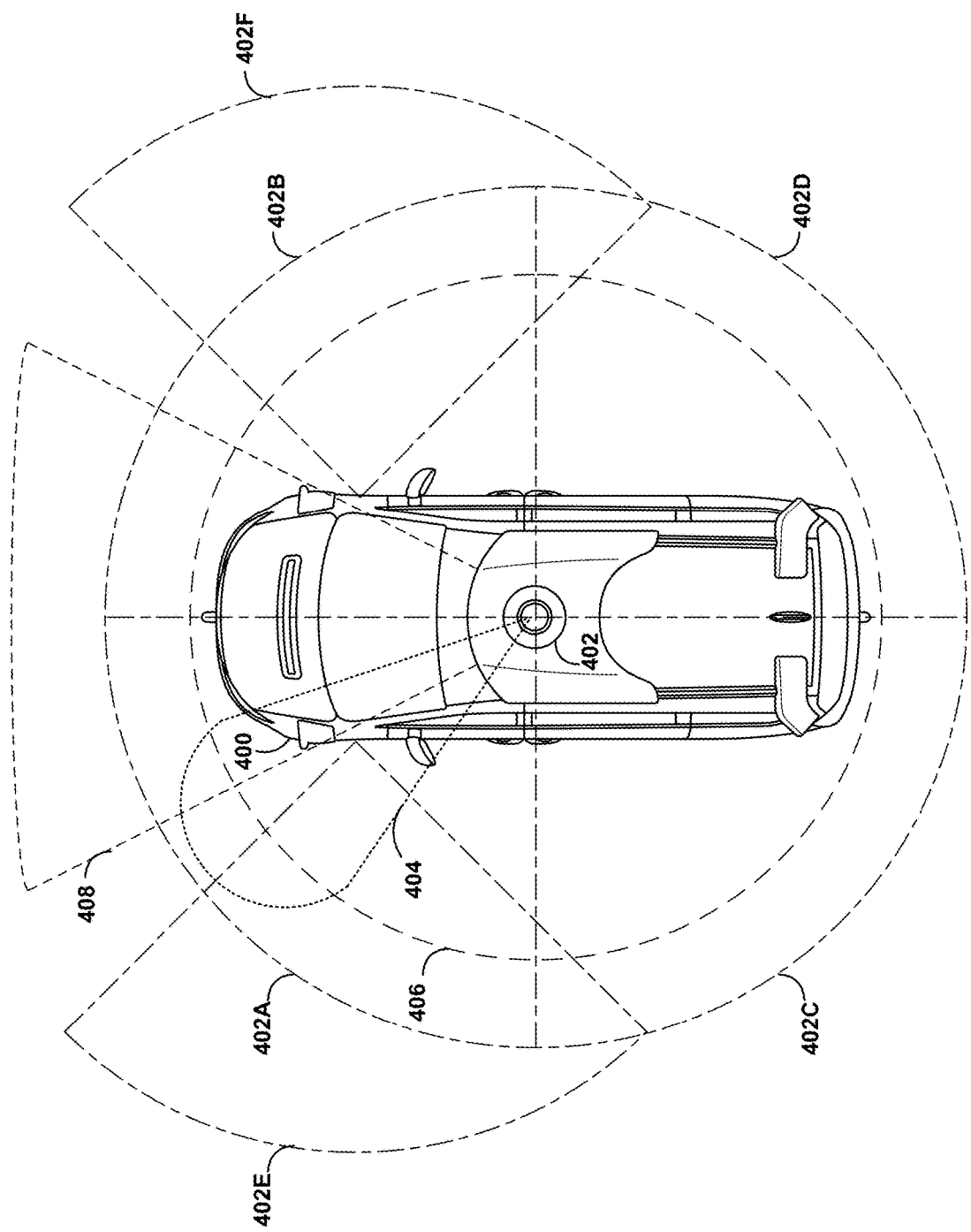
FIG. 4A illustrates an example autonomous vehicle having sensor fields of view.

FIG. 4A illustrates an example autonomous vehicle 400 having various sensor fields of view. As previously discussed with respect to FIG. 2, a vehicle 400 may contain a plurality of sensors. The locations of the various sensors may correspond to the locations of the sensors disclosed in FIG. 2. However, in some instances, the sensors may have other locations. Sensors locations are omitted from FIG. 4A for simplicity of the drawing. For each sensor unit of vehicle 400, FIG. 4A shows a respective field of view. The field of view of a sensor may include a angular region over which the sensor may detect objects and a range that corresponds to maximum distance from the sensor at which the sensor may reliable detect objects.

As previously disclosed, a vehicle 400 may include six radar units. A first radar unit may be located on the front-left of the vehicle and have an angular field of view corresponding to the angular portion of field of view 402A. A second radar unit may be located on the front-right of the vehicle and have an angular field of view corresponding to the angular portion of field of view. A third radar unit may be located on the rear-left of the vehicle and have an angular field of view corresponding to the angular portion of field of view 402C. A fourth radar unit may be located on the rear-right of the vehicle and have an angular field of view corresponding to the angular portion of field of view 402D. A fifth radar unit may be located on the left side of the vehicle and have an angular field of view corresponding to the angular portion of field of view 402E. A sixth radar unit may be located on the right side of the vehicle and have an angular field of view corresponding to the angular portion of field of view 402F. Each of the six radar units may be configured with a scannable beamwidth of 90 degrees. A radar beamwidth may be smaller than 90 degrees, but each radar unit may be able to steer the radar beam across the 90-degree field of view.

A first LIDAR unit of the vehicle 400 may be configured to scan the full 360-degree region around the vehicle as shown by an angular field of view corresponding to the angular portion of field of view 404. A second LIDAR unit of the vehicle 400 may be configured to scan a region smaller than the 360-degree region around the vehicle. In one example, the second LIDAR unit may have an 8-degree field of view in the horizontal plant as shown by an angular field of view corresponding to the angular portion of field of view 404.

Additionally, the vehicle may also include at least one camera. The camera may be an optical camera and/or an infrared camera. The camera may have an angular field of view corresponding to the angular portion of field of view 408.

In addition to the field of view for each of the various sensors of vehicle 400, each sensor may also have a corresponding range. In one example, the range of the radar units may be greater than the range of either LIDAR unit, as shown by the field of the views of the radar units 402A-402E extending further than the fields of view for the LIDAR units 404 and 406. Additionally, the second LIDAR unit may have a range that is greater than a range of the first LIDAR unit, as shown by field of view 406 extending further than field of view 404. The camera may have a range shown by the extent of the field of view 408. In various examples, the range of the camera may be greater than or less than the range of the other sensors.

Figure 4B:
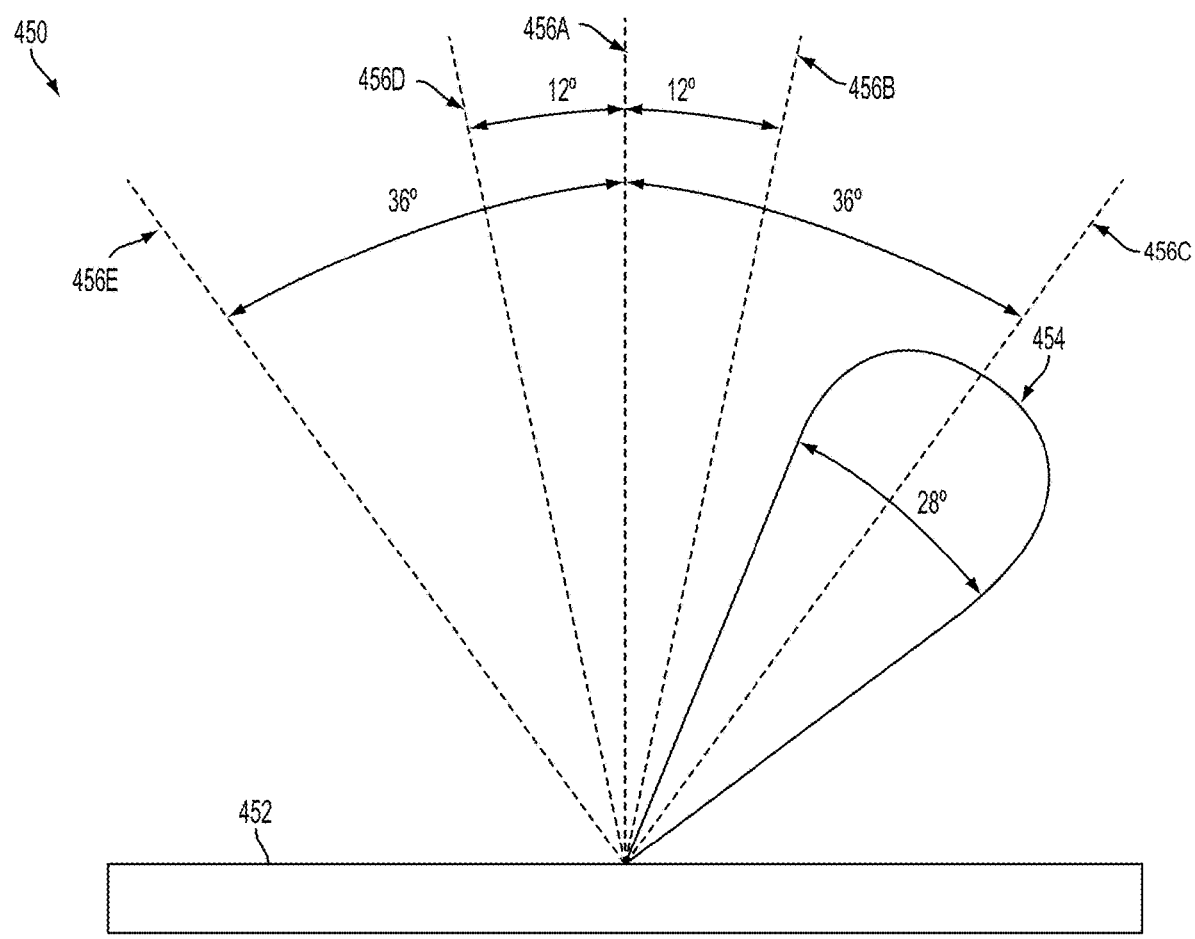
FIG. 4B illustrates example sectors of a radar sensors.

FIG. 4B illustrates example beam steering for a radar unit 450. The radar unit 452 may be configured with a steerable beam, i.e., the radar unit 452 may be able to control a direction in which the beam radiates. By controlling the direction in which the beam is radiated, the radar unit 452 may be able to direct radiation in a specific direction in order to determine radar reflections (and thus objects) in that direction. In some embodiments, the radar unit 452 may be able to scan a radar beam in a continuous manner across the various angles of the azimuth plane. In other embodiments, the radar unit 452 may be able to scan the radar beam in discrete steps across the various angles of the azimuth plane.

The example radar unit 452 in FIG. 4B has a radar beam 454 that can be steered across a plurality of different angles, each angle to which the radar beam 454 is steered may be called a sector of the radar unit 452. As shown in FIG. 4B, the radar beam 454 may have a half-power beamwidth of approximately 28 degrees. The half-power beamwidth describes the width, measured in degrees, of a main lobe of the radar beam 454 between two points that correspond to half the amplitude of the maximum of the radar beam 454. In various embodiments, the half-power beamwidth of the radar beam 454 may be different than 28 degrees. Additionally, in some embodiments, the half-power beamwidth of the radar beam 454 may change depending on the angle at which the radar beam 454 is pointed. For example, the half-power beamwidth of the radar beam 454 may be narrower when the radar beam 454 is pointed more closely to the orthogonal 456A (i.e. broadside) direction to the radiating surface and widen and the radar beam 454 is steered away from the orthogonal direction 456A. In these examples, the radar beam 454 may have a beamwidth of 28 degrees when steered to angles 456C and 456E, the beam may be more narrow, such as 24 degree, when steered more closely to broadside 456A.

In the example shown in FIG. 4B, the radar beam may be able to be steered to four different angles. The steering angle may be measured with respect to the orthogonal 456A (i.e. broadside) direction to the radiating surface. The beam may be steered to +36 degrees at 456C and −36 degrees at 456E. Also, the beam may be steered to +12 degrees at 456B and −12 degrees at 456D. The four different angles may represent the discrete angles to which the radar beam 454 may be steered. In some additional examples, the radar beam may be able to be steered to two angles simultaneously. For example, the radar beam may be steered to both +12 and −12 degrees at the same time. This may result in a beam that is overall steered in the direction of the sum of the angles (e.g. −12+12=0, thus the beam in this example would be in the broadside direction 204a). However, when a radar beam is steered at two directions at once, the half-power beamwidth of the radar beam may be widened. Thus, a radar resolution may decrease.

By steering the radar beam 454 to each of angles 456B-456E, the full 90-degree field of view can be scanned. For example, when the radar beam 454 is steered to +36 degrees 456C, the half-power beamwidth of the radar beam 454 will cover from +50 degrees to +22 degrees (as measured from the broadside direction 204a). Additionally, when the radar beam 454 is steered to −36 degrees 456E, the half-power beamwidth of the radar beam 454 will cover from −50 degrees to −22 degrees. Further, when the radar beam 454 is steered to +12 degrees 456B, the half-power beamwidth of the radar beam 206 will cover from +24 degrees to 0 degrees. And finally, when the radar beam 206 is steered to −12 degrees 456D, the half-power beamwidth of the radar beam 454 will cover from −24 degrees to 0 degrees. Thus, the radar beam 454 will effectively be able to scan (i.e. selectively enable or disable the four beams spanning the angular width) from −50 to +50 degrees, covering a range of 100 degrees. The number of steering angles, the direction of the steering angles, and the half-power beamwidth of the radar beam 206 may be varied depending on the specific example.

Figure 5A:
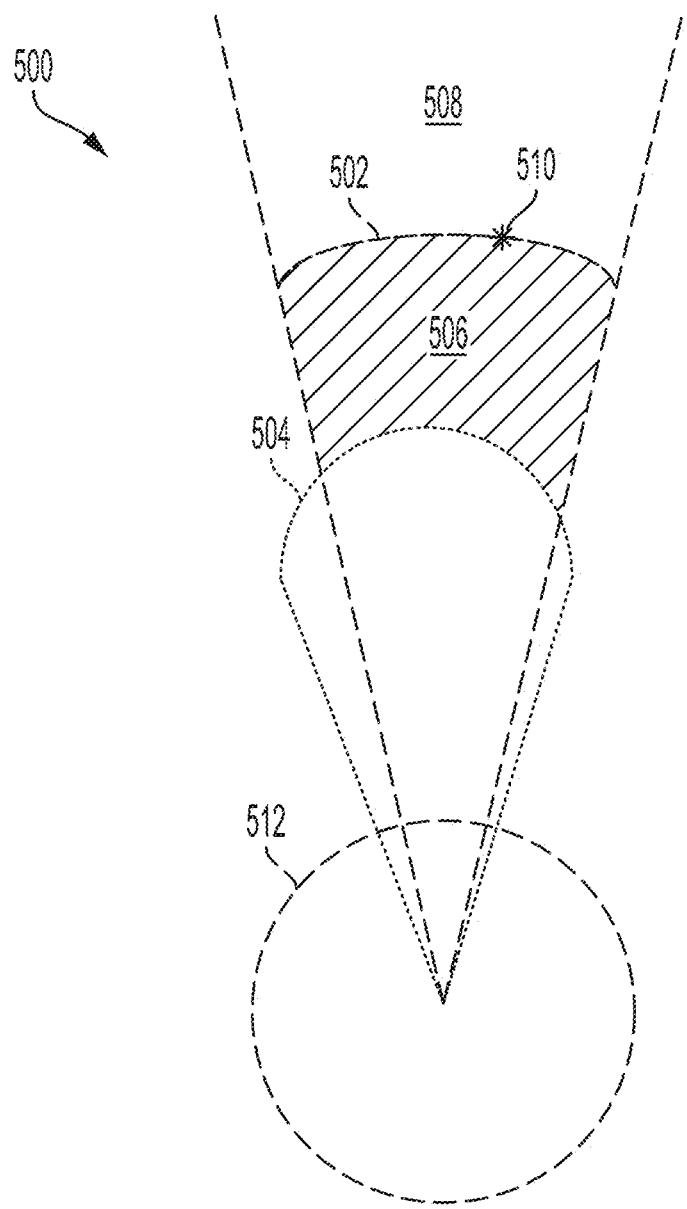
FIG. 5A illustrates an example field of view extension.

FIG. 5A illustrates an example field of view extension 500. The field of view extension 500 depicts the field of view for three different sensors. A sector of a radar sensor may have a sector field of view shown by region 508. A steerable LIDAR sensor may have a field of view of 504. An omnidirectional LIDAR sensor may have a field of view of 512. During the operation of the sensors, the radar sector may have a sector field of view 508 that has a range greater than the range of the field of view 504 for the steerable LIDAR sensor. Additionally, the range of the field of view 504 for the steerable LIDAR sensor may be greater than the field of view 512 for the omnidirectional LIDAR sensor.

In the example shown in FIG. 5A, a radar sensor may detect object 510. Thus, within the sector of the radar sensor, a range may be established at range 502. Therefore, the region 506 may be a region that is further than the range of either LIDAR sensor, but within the range of a radar sensor. Because the region 506 is further than the LIDAR range, but closer than the first object detection, the system may be able to determine that region 506 is free of occlusions. Therefore, a planning or controller system of a vehicle may be able to determine that region 506 may be occlusion free from any potential objects and treat the spaces as open when routing the vehicle or monitoring the vehicle's movements.

Figure 5B:
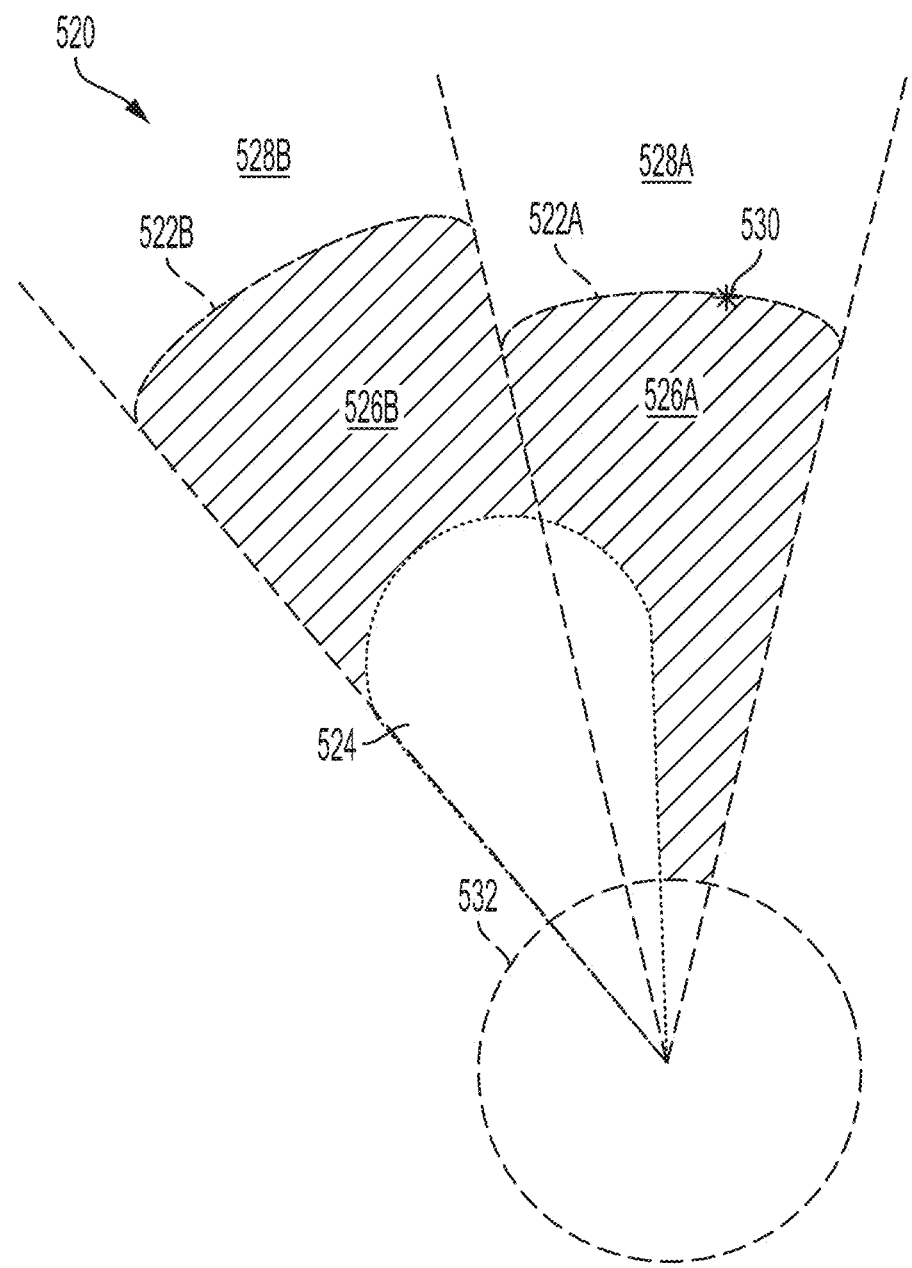
FIG. 5B illustrates an example field of view extension.

FIG. 5B illustrates an example field of view extension 520. The field of view extension 520 depicts the field of view for three different sensors. A first sector of a radar sensor may have a sector field of view shown by region 528A and a second sector of the radar sensor (or a sector of a different radar sensor) may have a second sector field of view shown by region 528B. A steerable LIDAR sensor may have a field of view of 524. An omnidirectional LIDAR sensor may have a field of view of 532. During the operation of the sensors, the radar sector may have a first sector field of view 528A and a second sector field of view 528B that each have a range greater than the range of the field of view 524 for the steerable LIDAR sensor. Additionally, the range of the field of view 524 for the steerable LIDAR sensor may be greater than the field of view 532 for the omnidirectional LIDAR sensor.

In the example shown in FIG. 5B, a radar sensor may detect object 530 within one of the two radar sectors. Thus, within the sector of the radar sensor, a range may be established at range 522A. Therefore, the region 526A may be a region that is further than the range of either LIDAR sensor, but within the range of a given sector of the radar sensor. Additionally, within the second sector field of view shown by region 528B, the radar may not detect any objects. Therefore, the range 522B may be a predetermined maximum range of the radar unit. Thus, the region 526B may be a region that is further than the range of either LIDAR sensor, up to the maximum range of the radar unit.

Because the region 526A is further than the LIDAR range, but closer than the first object detection, the system may be able to determine that region 526A is free of occlusions. Similarly, because the region 526B is further than the LIDAR range, the system may be able to determine that region 526B is free of occlusions up to the maximum range of the radar unit. Therefore, a planning or controller system of a vehicle may be able to determine that regions 526A and 526B may be occlusion free from any potential objects and treat the spaces as open when routing the vehicle or monitoring the vehicle's movements.

Figure 5C:
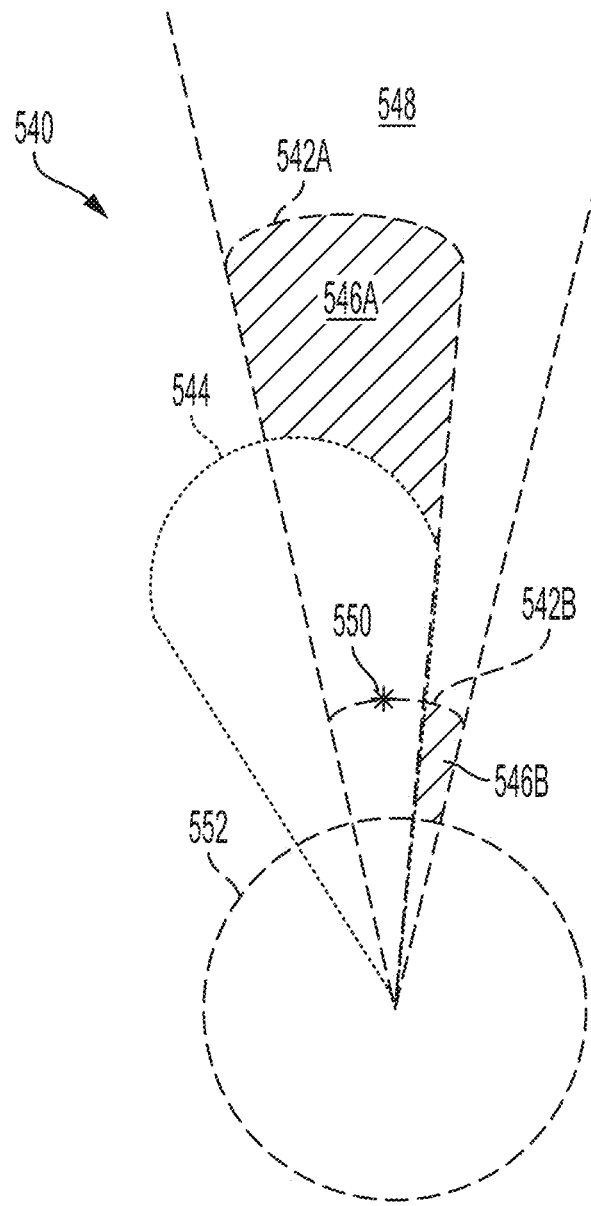
FIG. 5C illustrates an example field of view extension.

FIG. 5C illustrates an example field of view extension 540. The field of view extension 540 depicts the field of view for three different sensors. A sector of a radar sensor may have a sector field of view shown by region 548. A steerable LIDAR sensor may have a field of view of 544. An omnidirectional LIDAR sensor may have a field of view of 552. During the operation of the sensors, the radar sector may have a sector field of view 548 that has a range greater than the range of the field of view 544 for the steerable LIDAR sensor. Additionally, the range of the field of view 544 for the steerable LIDAR sensor may be greater than the field of view 552 for the omnidirectional LIDAR sensor.

In the example shown in FIG. 5C, a radar sensor may detect object 550. As shown in FIG. 5C, the object may be detected by the radar unit (and possibly the steerable LIDAR unit) at a range of 542B. In some examples, the range 542B may be less than half of the range of the range 544 of the steerable LIDAR unit. Because the range 542B is less than half the range 544 of the steerable LIDAR unit, the system may be able to use a portion of the radar sector field of view 548 that overlaps with the angular portion of the field of view of the steerable LIDAR unit to determine space free from occlusions.

Therefore, as shown in FIG. 5C, the region 546A may be a region that is further than the range of either LIDAR sensor and overlapping with the angular portion of the field of view of the steerable LIDAR unit, but within the range 542A of the radar sensor. Because the region 546A is further than the LIDAR range, the system may be able to determine that region 546A is free of occlusions up to the maximum range of the radar unit. However, for the portion of the field of view 548 of the radar that is outside of the field of view 544 of the steerable LIDAR sensor, the system may be able to determine that region 546B is free of occlusions between the range of the omnidirectional LIDAR sensor 552 and the range to the radar detection 542B. Thus, region 546B may also be determined to be occlusion free. Therefore, a planning or controller system of a vehicle may be able to determine that regions 546A and 546B may be occlusion free from any potential objects and treat the spaces as open when routing the vehicle or monitoring the vehicle's movements.

Figure 5D:
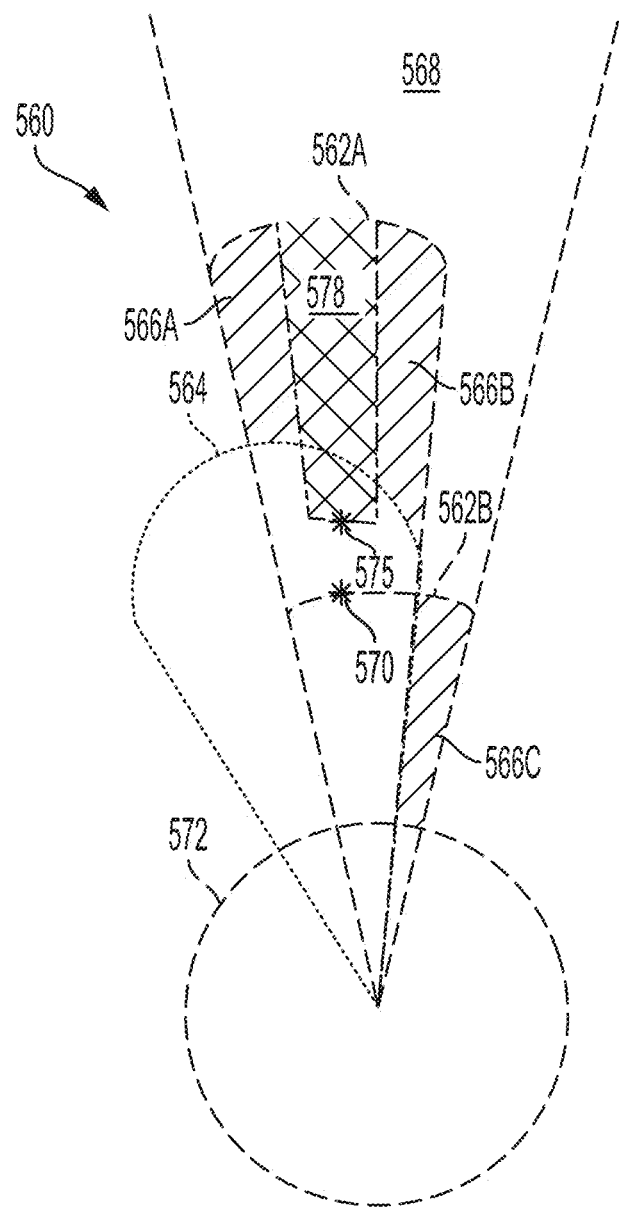
FIG. 5D illustrates an example field of view extension.

FIG. 5D illustrates an example field of view extension 560. The field of view extension 560 depicts the field of view for three different sensors. A sector of a radar sensor may have a sector field of view shown by region 568. A steerable LIDAR sensor may have a field of view of 564. An omnidirectional LIDAR sensor may have a field of view of 572. During the operation of the sensors, the radar sector may have a sector field of view 568 that has a range greater than the range of the field of view 564 for the steerable LIDAR sensor. Additionally, the range of the field of view 564 for the steerable LIDAR sensor may be greater than the field of view 572 for the omnidirectional LIDAR sensor.

In the example shown in FIG. 5D, a radar sensor may detect objects 570 and 575. As shown in FIG. 5D, the first object may be detected by the radar unit (and possibly the steerable LIDAR unit) at a range of 562B. In some examples, the range 562B may be less than half of the range of the range 564 of the steerable LIDAR unit. Because the range 562B is less than half the range 564 of the steerable LIDAR unit, the system may be able to use a portion of the radar sector field of view 568 that overlaps with the angular portion of the field of view of the steerable LIDAR unit to determine space free from occlusions. Additionally, the second object 575 may be detected by the steerable LIDAR unit and the radar unit. The object 575 may occlude both the field of view 564 of the steerable LIDAR unit and the field of view 568 of the radar unit as occlusion region 578.

Therefore, as shown in FIG. 5D, the regions 566A and 566B may be regions that are further than the range of either LIDAR sensor and overlapping with the angular portion of the field of view of the steerable LIDAR unit, but within the range 562A of the radar sensor. Because the regions 566A and 566B are further than the LIDAR range, the system may be able to determine that both regions 566A and 566B are free of occlusions up to the maximum range of the radar unit.

Because of object 575, there is a portion of the field of view 568 of the radar unit that is within the angular portion of the field of view of the steerable LIDAR unit that cannot be determined to be free of occlusions because object 575 is blocking the field of view.

Additionally, for the portion of the field of view 568 of the radar that is outside of the field of view 564 of the steerable LIDAR sensor, the system may be able to determine that region 566C is free of occlusions between the range of the omnidirectional LIDAR sensor 572 and the range to the radar detection 562B. Thus, region 566C may also be determined to be occlusion free. Therefore, a planning or controller system of a vehicle may be able to determine that regions 566A, 566B, and 566C may be occlusion free from any potential objects and treat the spaces as open when routing the vehicle or monitoring the vehicle's movements.

Figure 5E:
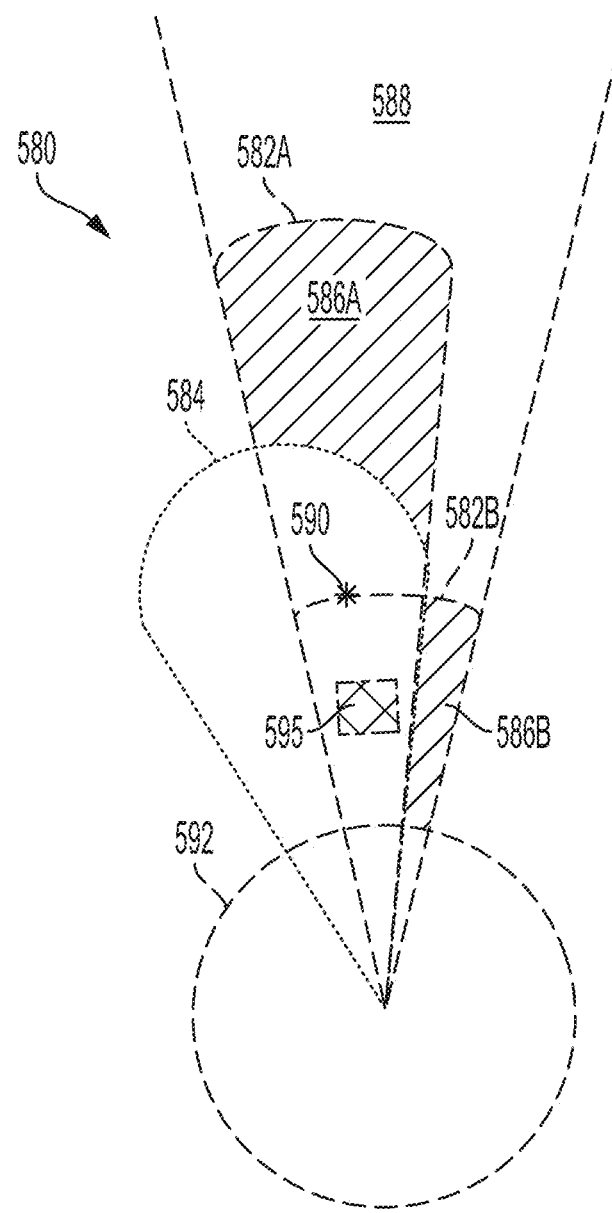
FIG. 5E illustrates an example field of view extension.

FIG. 5E illustrates an example field of view extension 580. The field of view extension 580 depicts the field of view for three different sensors. A sector of a radar sensor may have a sector field of view shown by region 588. A steerable LIDAR sensor may have a field of view of 584. An omnidirectional LIDAR sensor may have a field of view of 592. During the operation of the sensors, the radar sector may have a sector field of view 588 that has a range greater than the range of the field of view 584 for the steerable LIDAR sensor. Additionally, the range of the field of view 584 for the steerable LIDAR sensor may be greater than the field of view 592 for the omnidirectional LIDAR sensor.

In the example shown in FIG. 5E, a radar sensor may detect object 590. As shown in FIG. 5E, the object may be detected by the radar unit (and possibly the steerable LIDAR unit) at a range of 582B. In some examples, the range 582B may be less than half of the range of the range 584 of the steerable LIDAR unit. Because the range 582B is less than half the range 584 of the steerable LIDAR unit, the system may be able to use a portion of the radar sector sector field of view 588 that overlaps with the angular portion of the field of view of the steerable LIDAR unit to determine space free from occlusions. Additionally, the steerable LIDAR unit may also detect an occlusion 595. However, this occlusion 595 may not be detected by the radar unit. For example, LIDAR may detect fog, but the fog may be transparent to radar. Therefore, occlusion 595 may not affect the field of view 588 of the radar unit.

Therefore, as shown in FIG. 5E, the region 586A may be a region that is further than the range of either LIDAR sensor and overlapping with the angular portion of the field of view of the steerable LIDAR unit, but within the range 582A of the radar sensor. Because the region 586A is further than the LIDAR range, the system may be able to determine that region 586A is free of occlusions up to the maximum range of the radar unit. However, for the portion of the field of view 548 of the radar that is outside of the field of view 584 of the steerable LIDAR sensor, the system may be able to determine that region 586B is free of occlusions between the range of the omnidirectional LIDAR sensor 592 and the range to the radar detection 582B. Thus, region 586B may also be determined to be occlusion free. Therefore, a planning or controller system of a vehicle may be able to determine that regions 586A and 586B may be occlusion free from any potential objects and treat the spaces as open when routing the vehicle or monitoring the vehicle's movements.

Figure 6:
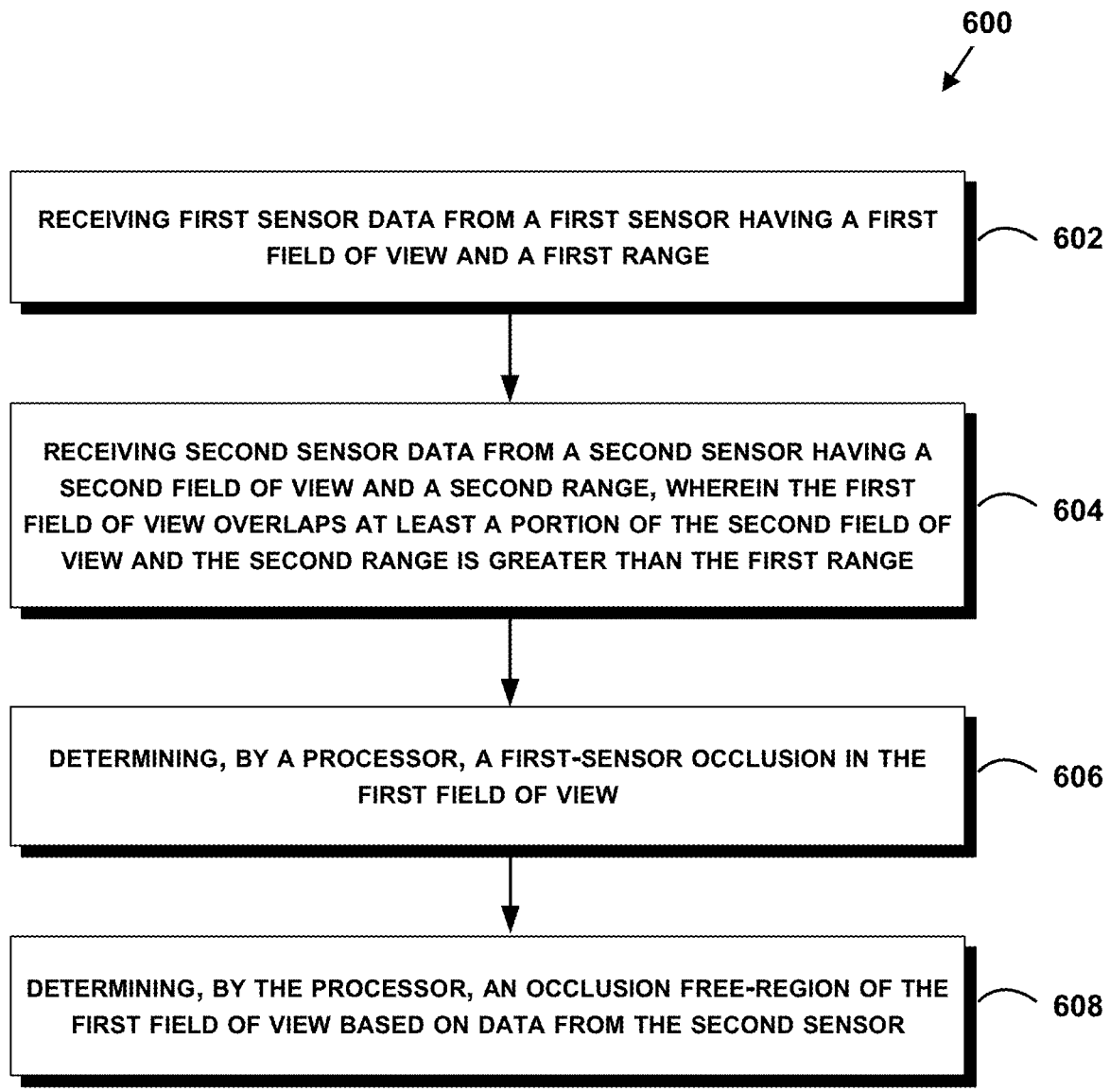
FIG. 6 illustrates an example method.

FIG. 6 is a flowchart of a method 600, according to an example embodiment. Method 600 may include one or more operations, functions, or actions as illustrated by one or more of blocks 602-610. Although the blocks of each method are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 600, and other processes and methods disclosed herein, the flowcharts show functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Additionally or alternatively, for the method 600, and other processes and methods disclosed herein, one or more blocks in the flowchart may represent circuitry that is wired to perform the specific logical functions in the process.

In some examples, for the method 600, and other processes and methods disclosed herein, the functions described in the flowchart may be performed by a single vehicle (e.g., vehicle 100, 200, etc.), distributed between multiple vehicles, performed by a remote server/external computing system (e.g., systems 302 and 306), and/or performed by a combination of one or more external computing systems and one or more vehicles, among other possibilities.

In some examples, before block 602 is performed, the system may initially limit the absolute field of view by the radar's own estimate of the probability of track, and also to an absolute maximum range. Thus, the maximum range over which unoccluded regions may be determined may be a maximum range at which the radar units may be able to track an object. In some examples, the maximum range may be based on a probability-of-detection threshold. The maximum range may be determined based on the probability of detection of an object at the given range exceeding a threshold. In some examples, the range may be limited to a distance where the probability of tracking a moving object is 95%. In practice, the radar range may be limited to 220 meters in some examples.

At block 602, method 600 involves receiving first sensor data from a first sensor having a first field of view and a first range. In some examples, the first sensor may be a LIDAR sensor. In various examples, the LIDAR sensor may be configured to rotate and have a field of view that corresponds to the full 360-degree plane around the vehicle up to a predetermined range. In other examples, the LIDAR sensor may be configured to be steerable and have a field of view that corresponds to less than the full 360-degree plane around the vehicle up to a predetermined range. In these examples, the LIDAR sensor may have a field of view that is less than 10 degrees wide, for example, 8 degrees wide. In some examples, block 602 may operate with both the first and second LIDAR units.

During the operation of a LIDAR unit, the LIDAR unit may transmit laser light pulses into the field of view of the LIDAR unit. The laser light pulses may reflect of objects within the field of view and be received back by the LIDAR unit. The LIDAR unit may convert the reflected light into data. In some examples, a LIDAR processor may convert the data into a LIDAR point cloud.

At block 604, method 600 involves receiving second sensor data from a second sensor having a second field of view and a second range, wherein the first field of view overlaps at least a portion of the second field of view and the second range is greater than the first range. In some examples, the second sensor may be a radar sensor. In various examples, the radar sensor may be configured to have a field of view that corresponds to a 90-degree portion of the plane around the vehicle up to a predetermined range. Additionally, the radar sensor may be further configured to operate over a plurality of sectors. In one example, the radar unit may have four sectors that comprise the 90-degree field of view.

During the operation of a radar unit, the radar unit may transmit electromagnetic energy radar pulses into the field of view of the radar unit. The electromagnetic energy radar pulses may reflect of objects within the field of view and be received back by the radar unit. The radar unit may convert the reflected electromagnetic energy radar pulses into data. In some examples, a radar processor may convert the data into a radar point cloud or other data format.

At block 606, method 600 involves determining, by a processor, a first-sensor occlusion in the first field of view. The first sensor occlusion may be an object that causes LIDAR pulses to be reflected back to the LIDAR unit. In some examples, a LIDAR processor (or other processor) may determine a distance and angle to the object that reflected the LIDAR pulse. Various objects may have a distance and angle to the object determined by the processor.

In some examples, block 606 may use the LIDAR field of view to limit the effective radar field of view. At each bearing angle, ranges between half the maximum distance of the respective LIDAR unit and the maximum distance of the LIDAR unit may be checked for LIDAR occlusions. If any occlusions are found, then the radar range is limited to the range to that occluder. Thus, at block 606, the system may determine an occluded region in the second sensor field of view, based on the first-sensor occlusion.

And consequently, the field of view for the full system may also be limited to the detected occluder distance at the respective angle to the occluding object. In practice, by limiting the system field of view for the radar unit based on the LIDAR occlusion, the system may reduce the risk of false confidence of extended radar range when the radar is occluded but no detections are found on the occluder. Restricting the search to the second half of the LIDAR range also reduces the chance that the first detection we see beyond the LIDAR range is a reflection, and allows the radars to "see over" close occluders. For example, because the LIDAR and radar units are not necessarily mounted in the exact same location, in some examples, the radar may be able to see past the LIDAR occlusion(s). By only searching the second half of the LIDAR range for occluders, situations where the radar can see around occlusions may enable the system to extend the overall field of view for situations where the radar unit can see past some occlusions.

In practice, this system operates in a conservative manner assuming that some occluders will not produce radar detections and some radar detections that are in fact occluders don't overlap precisely with LIDAR obstacles/occlusions.

Additionally, at block 606, the method also includes determining, by the processor, the first-sensor occlusion is greater than the first-sensor range. In fact, if there are no LIDAR occlusions, the system may determine that the range of the LIDAR is free of occlusions and therefore the first occlusion is at a location greater than the LIDAR range. Thus, in these situations the system may be able to extend the occlusion free region based on data from another sensor, such as a radar sensor. In these situations, the first sensor occlusion may actually be no occlusion.

At block 608, method 600 involves determining, by the processor, an occlusion free-region of the first field of view based on data from the second sensor. For each angle where there is no first sensor occlusion between half the maximum sensor distance and the maximum sensor distance, block 608 may determine the first occlusion at that angle within a corresponding sector of a second sensor, such as a radar sensor. In practice, the first sensor may be a LIDAR sensor. When there are no occlusions between half the maximum LIDAR distance and the maximum LIDAR distance at a given angle, the system may operate a sector of a radar unit that corresponds to the same angle to determine the closest radar occlusion greater than the LIDAR maximum distance. Thus, the maximum occlusion free region may for that angle may correspond to the distance to the first radar occlusion of the corresponding sector. Thus, in some examples, block 608 may determine that the occlusion free-region is a region greater than the first range (i.e., the range of the LIDAR sensor).

For example, the system may determine an occlusion free-region of the first field of view based on data from the second sensor that is outside of the range of the first sensor or outside the field of view of the first sensor. In some examples, the first sensor (e.g., a LIDAR sensor) may determine that is has an occlusion. Data from the second sensor (e.g., a radar sensor) may be able to determine that the first sensor occlusion is a false positive. For example, fog or rain may be determined to be an occlusion of the first sensor. Data from the radar sensor may be used to determine that the region is really occlusion free of objects.

In practice, at block 608, the transmit sector geometry is taken into account for determining the occlusions. For each radar detection, the extent of the detection's transmit sector at the detection range is walked along, and any point at that boundary which is either beyond LIDAR range, or within range but not visible to any LIDAR is marked as occluded to the radar as well. Thus, the result of block 608 may indicate regions that are not visible to radar. Because of the radar sectors, the angular region over which occlusions affect the field of view may be wider than that of the LIDAR.

After block 608, method 600 may include operating, by the processor, the vehicle in an autonomous mode based on determining the occlusion free-region. Operating the vehicle may include updating an autonomous vehicle planner of regions around the vehicle that are free of objects. By updating the planner, the vehicle's operation may be controlled in a safe manner. In another example, the vehicle may use the occlusion free-region to provide information or warnings to a human driver based on the operating conditions of the vehicle. For example, a warning may be provided if a turn is unsafe.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A system comprising:
a vehicle
a first sensor having a first field of view;
a second sensor having a second field of view, wherein the first field of view overlaps at least a portion of the second field of view, and wherein the first sensor and the second sensor are coupled to the vehicle; and
a processor configured to:
   determine a first-sensor occlusion in the first field of view;
   determine the first-sensor occlusion in the first field of view is a false positive based on sensor data from the second sensor, wherein the sensor data from the second sensor indicates rain or fog is in an environment of the vehicle; and,
   control the vehicle based on sensor data from the first sensor.

2. The system of claim 1, wherein:
the first sensor has a first range; and
the second sensor has a second range, greater than the first range.

3. The system of claim 2, wherein the processor is further configured to determine the first-sensor occlusion is greater than the first range.

4. The system of claim 2, wherein the first field of view is divided into a first plurality of sectors and the second field of view is divided into a second plurality of sectors, and wherein the first-sensor occlusion is determined on a per-sector basis.

5. The system according to claim 2, wherein the processor is further configured to:
determine an occluded region in the second sensor field of view, based on the first-sensor occlusion; and
determine an occlusion free-region of the first field of view based on data from the second sensor that is outside of the range of the first sensor or outside the field of view of the first sensor.

6. The system of claim 1, wherein the first sensor is a LIDAR sensor and the second sensor is a radar sensor.

7. The system of claim 1, wherein the first sensor is configured with a 360-degree field of view and the second sensor is configured with a 90-degree field of view.

8. The system of claim 1, wherein the processor is further configured to:
determine a second-sensor occlusion in the second field of view;
determine an occlusion free-region of the first field of view based on the second-sensor occlusion.

9. A method comprising:
receiving first sensor data from a first sensor having a first field of view and a first range;
receiving second sensor data from a second sensor having a second field of view and a second range, wherein the first field of view overlaps at least a portion of the second field of view and the second range is greater than the first range, and wherein the first sensor and the second sensor are coupled to a vehicle;
determining, by a processor, a first-sensor occlusion in the first field of view;
determining, by the processor, the first-sensor occlusion in the first field of view is a false positive based on second sensor data from the second sensor wherein second sensor data indicates rain or fog is in an environment of the vehicle; and
controlling the vehicle based on first sensor data from the first sensor.

10. The method of claim 9, further comprising determining, by the processor, the first-sensor occlusion is greater than the first-sensor range.

11. The method of claim 9, wherein the second field of view is divided into a second plurality of sectors, and wherein the first-sensor occlusion is determined on a per-sector basis.

12. The method of claim 9, further comprising:
determining, by the processor, an occluded region in the second sensor field of view, based on the first-sensor occlusion; and
determining, by the processor, an occlusion free-region of the first field of view based on data from the second sensor that is outside of the range of the first sensor or outside the field of view of the first sensor.

13. The method of claim 9, wherein the first sensor is a LIDAR sensor and the second sensor is a radar sensor.

14. The method of claim 9, wherein the first sensor is configured with a less than 10-degree field of view and the second sensor is configured with a 90-degree field of view.

15. The method of claim 9, further comprising:
determining, by the processor, a second-sensor occlusion in the second field of view;
determining, by the processor, an occlusion free-region of the first field of view based on the second-sensor occlusion.

16. A vehicle comprising:
a first LIDAR sensor having a first field of view divided into a first set of sectors and a first range;
a second LIDAR sensor having a second field of view divided into a second set of sectors and a second range;
at least one radar sensor having a radar-sensor field of view divided into a third set of sectors and a third range, wherein the radar-sensor field of view overlaps at least a portion of the first or second field of view; and
a processor configured to:
   determine a first-sensor occlusion in the first field of view or second field of view;
   determine the first-sensor occlusion in the first field or second field of view is a false positive based on sensor data from the radar sensor,
   wherein the sensor data from the radar sensor indicates rain or fog is in an environment of the vehicle; and
   operate the vehicle in an autonomous mode based on sensor data from the first LIDAR sensor or the second LIDAR sensor.

17. The vehicle of claim 16, wherein the first LIDAR sensor is configured with a 360-degree field of view, wherein the second LIDAR sensor is configured with an 8-degree field of view, and the radar sensor is configured with a 90-degree field of view.

18. The vehicle of claim 16, wherein the processor is further configured to:
determine one of a first-sensor occlusion for each sector in the first field of view and a second-sensor occlusion for each sector in the second field of view;
determine an occlusion free-region of the first field or second field of view based on data from the radar sensor.

* * * * *